(12) United States Patent
Revelis (10) Patent No.: US 7,475,615 B2
(45) Date of Patent: Jan. 13, 2009

(54) SELF-ADJUSTING PARKING BRAKE ACTUATOR FOR VEHICLES

(75) Inventor: Peter Revelis, Newmarket (CA)

(73) Assignee: Ventra Group Inc., Ontario (CA)

( * ) Notice: Subject to any disclaimer, the term of this patent is extended or adjusted under 35 U.S.C. 154(b) by 204 days.

(21) Appl. No.: 11/446,265

(22) Filed: Jun. 5, 2006

(65) Prior Publication Data

US 2007/0295149 A1  Dec. 27, 2007

(51) Int. Cl.
  *G05G 1/04* (2006.01)
(52) U.S. Cl. ....................................................... 74/523
(58) Field of Classification Search ................ 74/33, 74/34, 120, 519, 523, 526, 528, 473.16, 473.3; 192/223.4, 41 S, 81 C, 17 D, 12 BA
  See application file for complete search history.

(56) References Cited

U.S. PATENT DOCUMENTS

| | | | | |
|---|---|---|---|---|
| 2,251,893 | A * | 8/1941 | Snell | 74/503 |
| 2,329,859 | A * | 9/1943 | Snell | 74/503 |
| 5,609,066 | A |  3/1997 | Bunker | |
| 5,875,688 | A * | 3/1999 | Porter et al. | 74/512 |
| 5,950,496 | A |  9/1999 | Rampp | |
| 6,023,992 | A |  2/2000 | Cameno | |
| 6,282,980 | B1 |  9/2001 | Sykes | |
| 6,286,389 | B1 |  9/2001 | Papadatos | |
| 6,718,836 | B2 |  4/2004 | Revelis et al. | |
| 6,848,545 | B2 |  2/2005 | Scheuring, III et al. | |
| 2002/0174737 | A1 | 11/2002 | Revelis et al. | |
| 2003/0000780 | A1 |  1/2003 | Revelis et al. | |
| 2004/0074331 | A1 |  4/2004 | Sykes et al. | |
| 2004/0094372 | A1 |  5/2004 | Scheuring, III et al. | |
| 2005/0211009 | A1 |  9/2005 | Revelis et al. | |

FOREIGN PATENT DOCUMENTS

| | | |
|---|---|---|
| AU | 1997 15933 | 8/1997 |
| AU | 1543397 | 8/1997 |
| CN | 1198134 | 1/1997 |
| DE | 94/05849 | 4/1994 |
| DE | 29600996 | 1/1996 |
| DE | 29603591 | 2/1996 |
| DE | 597 01 934 | 1/1997 |
| DE | 29721843 | 12/1997 |
| DE | 10123525 A1 * | 5/2002 |
| EP | 754 135 | 4/1995 |
| EP | 754135 | 4/1995 |
| EP | 0869888 | 1/1997 |
| EP | 0869889 | 1/1997 |
| KR | 2004007938 A * | 1/2004 |
| WO | 95/27642 | 10/1995 |
| WO | 97/26162 | 7/1997 |

* cited by examiner

*Primary Examiner*—Vicky A Johnson
(74) *Attorney, Agent, or Firm*—Pillsbury Winthrop Shaw Pittman LLP (57) ABSTRACT

A self-adjusting parking brake actuator includes a brake lever that is movable between brake-released and brake-applied positions. A self-adjustment assembly connects to the lever and includes a rack, a pinion, and a clutch. The toothed rack mounts to the lever for movement relative to the lever along a longitudinal direction of the rack. The rack connects to a brake cable and is resiliently biased in a tensioning direction. The rotatable pinion continuously meshes with the toothed rack. The clutch engages to prevent the pinion from rotating when the brake lever is in its brake-applied position, and disengages to allow the spring-biased rack to take up slack in the brake cable when the lever is in its brake-released position.

14 Claims, 6 Drawing Sheets

SELF-ADJUSTING PARKING BRAKE ACTUATOR FOR VEHICLES

BACKGROUND OF THE INVENTION

1. Field of the Invention

The present invention relates to parking brake actuators that include mechanisms for automatically taking up slack in a brake cable of the parking brake system for vehicle.

2. Description of Related Art

In conventional parking brakes for vehicles, a hand or foot brake lever pivotally mounts to a frame of the vehicle or an intermediary parking brake actuator frame. A sheathed brake cable extends between an arm of the lever and a wheel brake of the vehicle. Pivotal movement of the brake lever from a disengaged position toward an engaged position tensions the brake cable, thereby engaging (i.e., activating) the wheel brake.

When a conventional parking brake is initially installed in a vehicle, slack in the brake cable is removed to minimize the extent to which the brake lever pivots before causing the wheel brake to begin engaging. Removing or taking up the slack in the brake cable minimizes the wasted stroke length of the lever and maximizes the useful lever stroke that an operator uses to create the braking force.

As a parking brake is repeatedly used, the brake cable tends to stretch and/or its cable sheathing tends to compress. This combination tends to create slack in the brake cable system that reduces the useful stroke length of the brake lever. In some circumstances the stretching of the cable and compression of the sheathing is so severe that the wheel brake does not securely engage even when an operator moves the brake lever into a fully engaged position.

Various conventional parking brake actuators include self-adjusting mechanisms that automatically take up slack in the brake cable to minimize or eliminate the problems associated with brake cable stretching. U.S. Pat. No. 5,950,496 discloses one such self-adjusting mechanism. A spring-biased tie rod extends between a lever-side end of the brake cable and a frame to automatically take up slack in the brake cable when the brake lever is disengaged and the brake lever is disconnected from the tie rod. As the brake lever is moved from its disengaged position toward its engaged position, clamping pieces, which attach to the brake lever, clamp and connect the tie rod to the brake lever such that additional movement of the brake lever moves the tie rod and brake cable in an engaging direction that causes the wheel brake to engage. When the brake lever is returned to its disengaged position, the clamping pieces release the tie rod to allow the spring biased tie rod to take up any slack that may have developed in brake cable.

Unfortunately, self-adjusting parking brakes such as that disclosed in U.S. Pat. No. 5,950,496 are not always reliable. For example, if the lever's clamping pieces fail to securely grasp the tie rod, then the brake lever will move into an engaged position without moving the brake cable (and wheel brake) into a fully engaged position. Consequently, a vehicle operator may believe, based on the engaged position of the brake lever, that the parking brake is fully and securely engaged, while in fact the wheel brake is not fully or securely engaged. U.S. Pat. No. 5,950,496 discloses the use of teeth on the tie rod and clamping pieces to help the clamping pieces securely grasp the tie rod. Unfortunately, teeth misalignment may cause only the tips of the mating teeth to contact each other when the lever moves toward the engaged position. The tip-to-tip contact may cause the teeth to slip relative to each other and cause subsequent teeth to bounce over each other without having the clamping pieces securely engage the tie rod.

BRIEF SUMMARY OF THE INVENTION

Accordingly, one aspect of one or more embodiments of the present invention provides an improved self-adjusting parking brake that takes up slack in the brake cable while ensuring that the brake cable is securely connected to the brake lever when the lever is moved into an engaged position.

Another aspect of one or more embodiments of the present invention provides a parking brake actuator that includes a brake lever movable between brake-released and brake-applied positions, and a self-adjustment assembly. The self-adjustment assembly includes a rack mounted for movement relative to the lever along a longitudinal direction of the rack. The rack has a plurality of rack teeth. The self-adjustment assembly further includes a cable connector for operatively connecting the rack to a brake cable, a resilient member constructed to bias the rack relative to the lever along its longitudinal direction in a tensioning direction, a rotatable pinion having pinion teeth that engage the rack teeth such that movement of the rack relative to the lever along its longitudinal direction rotates the pinion, and a clutch. The clutch has an engaged position that discourages the pinion from rotating at least in a first direction corresponding to movement of the rack relative to the lever opposite the tensioning direction. The clutch also has a disengaged position that allows the pinion to rotate in at least a second direction corresponding to movement of the rack relative to the lever in the tensioning direction. The clutch is constructed and positioned to be disposed in the disengaged position when the lever is in its brake-released position, and in the engaged position when the lever moves away from its brake-released position and toward its brake-applied position.

According to a further aspect of one or more of the above embodiments of the invention, the self-adjustment assembly connects to the lever for pivotal movement relative to the lever about a self-adjustment assembly axis.

According to a further aspect of one or more of the above embodiments of the invention, the self-adjustment assembly further includes a self-adjustment assembly frame pivotally connected to the lever at the self-adjustment assembly axis. The pinion rotatably connects to the self-adjustment assembly frame. The rack is mounted with respect to the self-adjustment assembly frame for movement relative to both the self-adjustment assembly frame and the lever along the longitudinal direction of the rack.

According to a further aspect of one or more of the above embodiments of the invention, the pinion rotatably connects to the lever.

According to a further aspect of one or more of the above embodiments of the invention, the actuator further includes the brake lever frame. The brake lever connects to the brake lever frame for movement relative to the brake lever frame between the brake lever's brake-released and brake-applied positions.

According to a further aspect of one or more of the above embodiments of the invention, the clutch includes a hub and a clutch spring wrapped around the hub. The hub connects to the pinion for rotation with the pinion relative to the rack. The clutch spring has a free end that is movable between an engaged position that engages the clutch, and a disengaged position that disengages the clutch. The free end is biased toward its engaged position. The free end of the clutch spring is positioned such that movement of the lever from its brake-applied to its brake-released position causes the free end to move into its disengaged position and engage the clutch.

According to a further aspect of one or more of the above embodiments of the invention, the actuator further includes a protrusion movably connected to the lever so as to move relative to the lever when the lever moves between its brake-released and brake-applied positions. Movement of the lever from its brake-applied to its brake-released position causes the free end of the clutch spring to abut the protrusion and move into its disengaged position. Conversely, movement of the lever from its brake-released position toward its brake-applied position separates the free end from the protrusion such that the free end moves into its engaged position.

Another aspect of one or more embodiments of the present invention provides a vehicle that is equipped with the above-described parking brake actuator.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF EMBODIMENTS OF THE INVENTION

FIGS. 1-6 illustrate a self-adjusting parking brake actuator 10 according to an embodiment of the present invention. The actuator 10 comprises a brake lever frame 20 (see FIGS. 2 and 4), a brake lever 30, and a self-adjustment assembly 35. The self-adjustment assembly 35 comprises a self-adjustment frame 40, a rack 50, a pinion 60, and a clutch 70.

The brake lever frame 20 serves as a mounting bracket and is constructed to be rigidly mounted to the frame of a wheeled vehicle 25. Alternatively, the brake lever frame 20 may be integrally formed with a frame component of the vehicle 25. While the illustrated vehicle 25 is a passenger car, the vehicle 25 may alternatively comprise any other type of parking-brake-equipped vehicle without deviating from the scope of the present invention (e.g., truck, SUV, golf cart, etc.).

Figure 2:
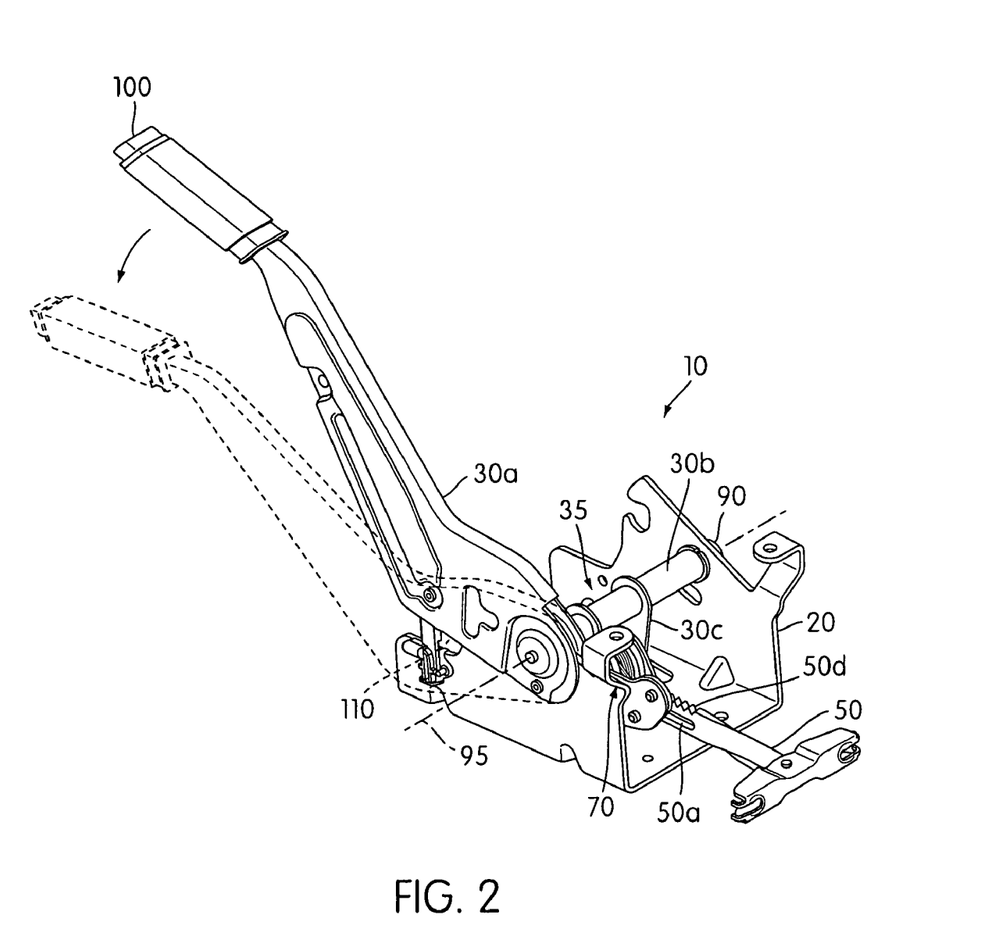
FIG. 2 is a left, rear, perspective view of the parking brake actuator shown in FIG. 1.

As shown in FIG. 2, the brake lever 30 connects to the brake lever frame 20 via a lever pivot rivet and tube 90 for pivotal movement relative to the frame 20 about a pivot axis 95 between a first unactuated position (shown in dotted lines in FIG. 2, also referred to as a brake-released position) and a second actuated position (shown in solid lines in FIG. 2, also referred to as a brake-applied position). A release button 100 and associated locking mechanism 110 facilitate locking of the lever 30 in the first position, the second position, or a variety of intermediate brake-applied positions, as is conventional. The locking mechanism 110 may utilize any suitable parking brake lever locking mechanism (e.g., those disclosed in U.S. Patent Application Publication Nos. 2002/0174737; 2003/0000780; 2004/0074331; and 2005/0211009, and U.S. Pat. Nos. 6,282,980; 6,286,389; and 6,718,836, the entire disclosures of which are incorporated herein by reference). As shown in FIG. 2, the brake lever 30 comprises a handle portion 30a, a pivot connection portion 30b, and a lever arm portion 30c that are interconnected for common pivotal movement relative to the frame 20.

In the illustrated embodiment, the handle portion 30a is offset from the lever arm portion 30c along the pivot axis 95. Offsetting the handle portion 30a from the lever arm 30c may be accomplished using any suitable structure (e.g., the structure utilized in Provisional Patent Application Serial No. 60/740,280, filed Nov. 29, 2005, titled "Brake Actuator With Offset Input Lever and Output Member," the entire contents of which are incorporated by reference herein). According to an alternative embodiment, the portions 30a and 30c may be aligned along the axis 95. For example, the handle portion 30a and lever arm portion 30c may be integrally formed from two parallel pieces of sheet metal that are welded or otherwise attached to the pivot connection portion 30b. As discussed below, the self-adjustment frame 40 may also be integrally formed from such parallel sheet metal pieces.

While the illustrated brake lever 30 pivotally connects to the frame 20, the brake lever 30 may alternatively movably connect to the frame 20 in any other suitable manner (e.g., linear sliding mechanism, 4-bar mechanism, curvilinear track, etc.) without deviating from the scope of the present invention.

While the illustrated brake lever 30 comprises a hand-operated parking brake lever that is mounted to the vehicle 25 for actuation by an operator's hand, the lever 30 may alternatively be designed and positioned within the vehicle 25 for foot operation without deviating from the scope of the present invention.

Figure 1:
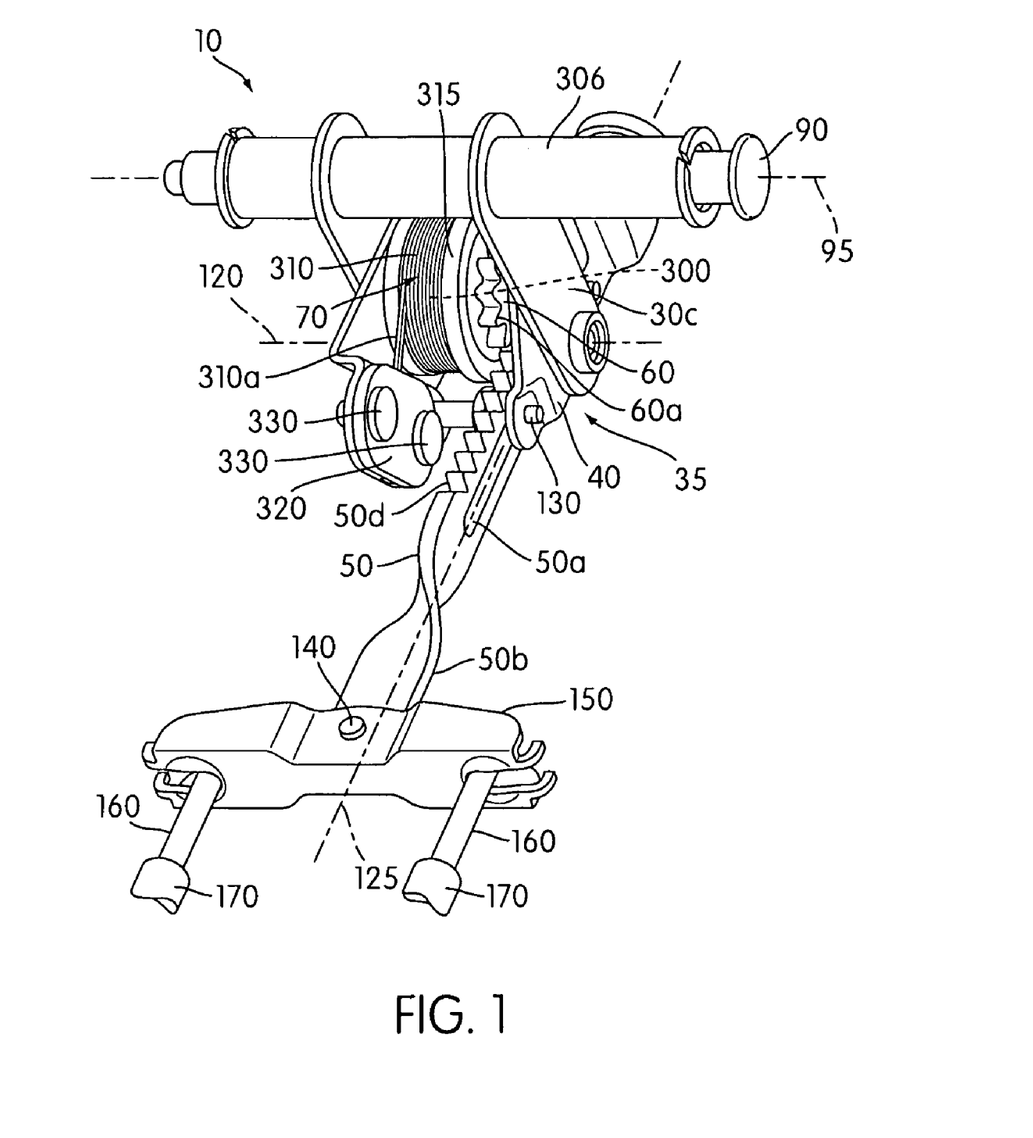
FIG. 1 is right, rear, partial, perspective view of a parking brake actuator according to an embodiment of the present invention.
Figure 3:
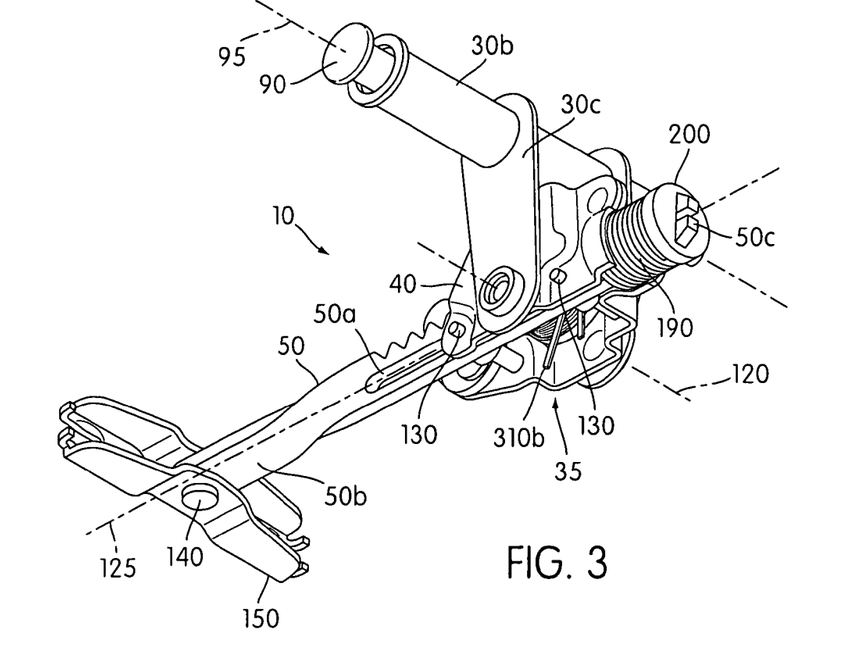
FIG. 3 is a bottom, right, partial, perspective view of the parking brake actuator shown in FIG. 1.

As shown in FIGS. 1 and 3, the self-adjustment frame 40 pivotally connects to the lever arm 30c for relative pivotal movement about a self-adjustment assembly pivot axis 120. The self-adjustment frame 40 moves from a first position to a second position when the brake lever 30 moves from the brake lever's first position to its second position. As explained below, movement of the self-adjustment frame 40 between its first and second positions involves rotation and translation relative to the frame 20.

As shown in FIG. 1, the rack 50 connects to the self-adjustment frame 40 for translational movement relative to the self-adjustment frame 40 along a longitudinal axis 125 of the rack 50. As shown in FIG. 3, two guide pins 130 mount to the self-adjustment frame 40 and extend through a longitudinally extending slot 50a in the rack 50 to facilitate the relative translational movement of the rack 50 along the axis 125 to take up slack in the brake cables 160, as explained below. The slot 50a preferably intersects the self-adjustment assembly pivot axis 120 or is in close proximity to the axis 120 so as to minimize bending forces that might be exerted on the rack 50 when the rack 50 encounters a longitudinally oriented tensile load.

As shown in FIG. 1, the pivotal connection between the self-adjustment frame 40 and the lever 30 enables the self-adjustment frame 40 to pivot such that the longitudinal axis 125 of the rack 50 tends to intersect the location where the sheathing 170 is anchored to the brake lever frame 20 or the frame of the vehicle 25. Consequently, the rack 50 tends to act as a tensile member between the pivot axis 120 and the anchor point of the sheathing 170. Such positioning minimizes bending forces that might otherwise act on the rack 50 during operation of the actuator 10.

Figure 9:
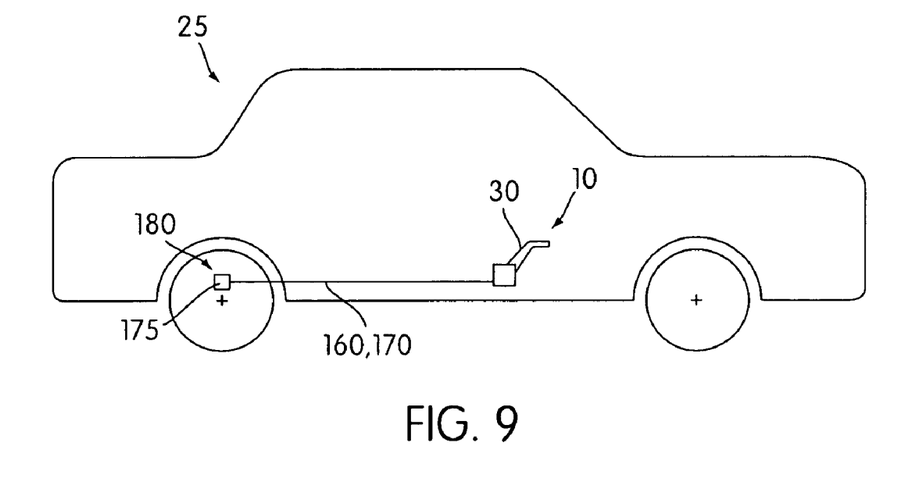
FIG. 9 is a side view of a vehicle with the parking brake actuator in FIG. 1 incorporated therein.

As shown in FIG. 1, a rearward portion 50b of the rack 50 pivotally connects via a rivet 140 to a cable equalizer 150. The cable equalizer 150 is constructed and arranged to engage two brake cables 160. The equalizer 150 may be replaced by any other suitable connector for operatively connecting the rack 50 to the brake cable(s) 160 without deviating from the scope of the present invention. As shown in FIG. 9, the brake cables 160 extend through brake cable sheathing 170 to cable-actuated parking brakes 175 to brake wheels 180 of the vehicle 25. An actuator end of the sheathing 170 is anchored to a frame of the vehicle 25 or the brake lever frame 20.

While the illustrated rack 50 is constructed and arranged to connect to plural brake cables 160 via the equalizer 150, the rack 50 may alternatively be constructed and arranged to connect to a single brake cable 160 without deviating from the scope of the present invention.

Figure 5:
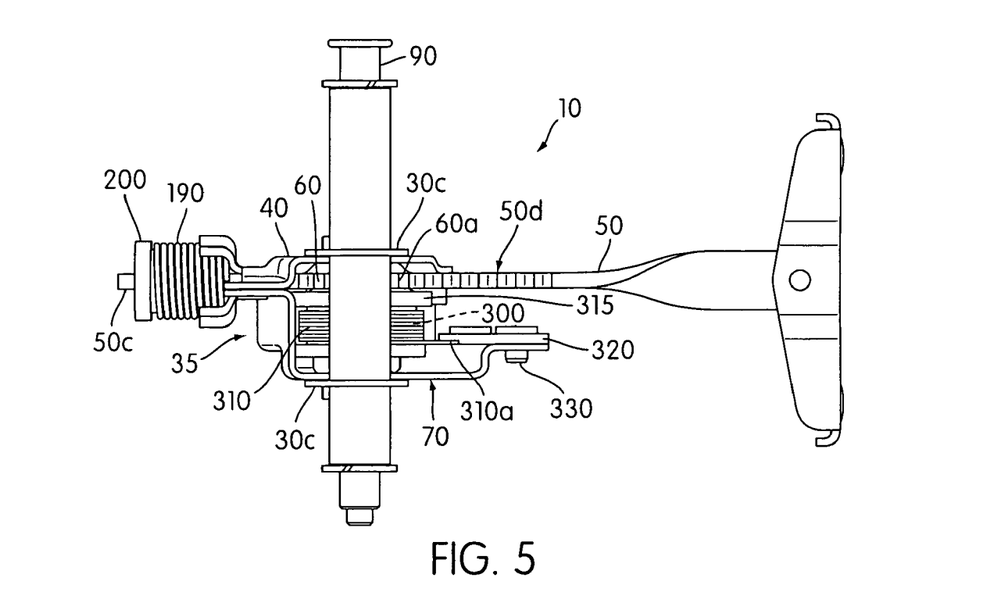
FIG. 5 is a partial top plan view of the parking brake actuator shown in FIG. 1.
Figure 6:
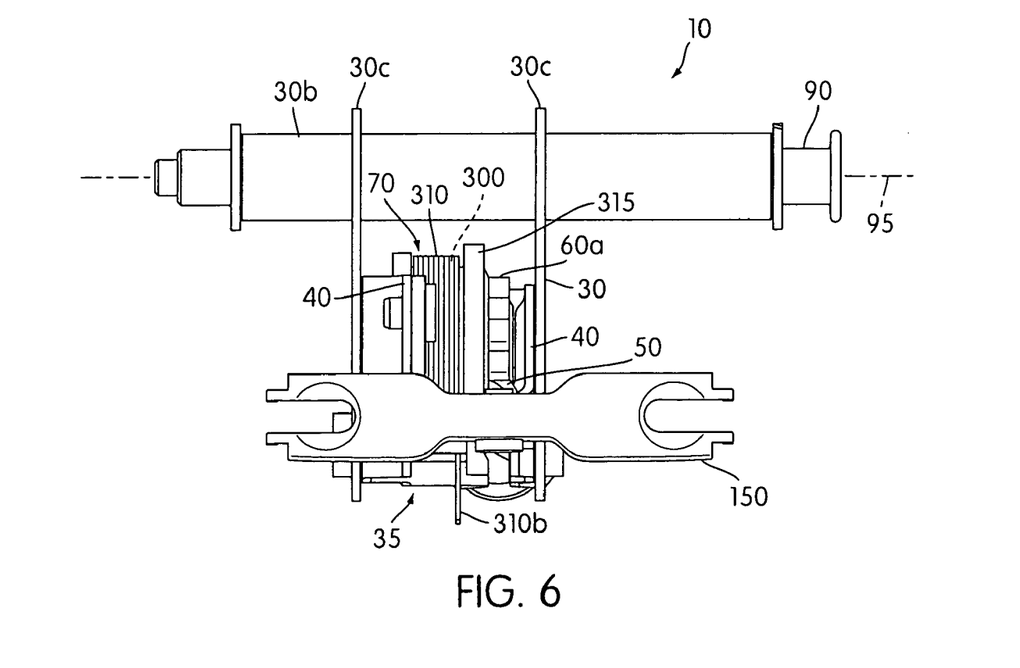
FIG. 6 is a partial rear plan view of the parking brake actuator shown in FIG. 1.

As shown in FIGS. 3 and 5, a compression spring 190 extends between the self-adjustment frame 40 and a forward portion 50c of the rack 50 to bias the rack 50 in a forward direction that tends to take up any slack in the brake cables 160. The rack 50 extends through the spring 190 and mounts to the spring 190 via a cap 200.

The rack 50 includes a plurality of rack teeth 50d that are spaced from each other along the longitudinal axis 125 of the rack 50. The rack teeth 50d continuously mesh with teeth 60a of the pinion 60. The pinion 60 rotatably connects to the self-adjustment frame 40 such that longitudinal movement of the rack 50 causes the pinion 60 to rotate and vice-versa.

As shown best in FIG. 5, the clutch 70 operatively extends between the pinion 60 and the self-adjustment frame 40. The clutch 70 has an engaged position that discourages the pinion 60 from rotating in a first direction (i.e., a direction that moves the rack 50 rearward and slackens the brake cables 160). The clutch 70 also has a disengaged position that allows the pinion 60 to rotate relative to the self-adjustment frame 40, thereby allowing the rack 50 to move longitudinally relative to the self-adjustment frame 40. The clutch 70 is constructed and positioned to be disposed in the disengaged position when the self-adjustment frame 40 is in its first position. The clutch 70 is constructed and positioned to be disposed in the engaged position when the self-adjustment frame 40 moves away from its first position toward its second position.

As shown in FIG. 1, the clutch 70 comprises a hub 300 and a clutch spring 310 wrapped around the hub 300. The hub 300 connects to the pinion 60 for rotation with the pinion 60 relative to the self-adjustment frame 40. Alternatively, the pinion 60 and hub 300 may be integrally formed. A nylon washer 315 is disposed on the hub 300 between the clutch spring 310 and pinion 60 to prevent the clutch spring 310 from "walking" over to the pinion 60 during use. The clutch spring 310 has a first end 310a (see FIGS. 1 and 5) and a second free end 310b (see FIGS. 3, 4, and 6). As shown in FIGS. 1 and 5, an anchor clip 320 and rivets 330 secure the first end 310a of the clutch spring 310 to the self-adjustment frame 40. The second free end 310b is pivotally movable about the axis 120 relative to the first end 310a between engaged and disengaged positions. When the second free end 310b is in the engaged position, the clutch spring 310 tightly embraces the hub 300 to prevent the pinion 60 from rotating in the first direction, thereby preventing the rack 50 from moving longitudinally in a rearward loosening direction relative to the self-adjustment frame 40. Conversely, when the first end 310a is in the disengaged position, the clutch spring 310 is slightly expanded to permit rotational movement of the hub 300 and pinion 310 relative to the self-adjustment frame 40, thereby permitting the spring-biased rack 50 to take up slack in the cables 160 by moving longitudinally forward under the force of the spring 190.

Figure 4:
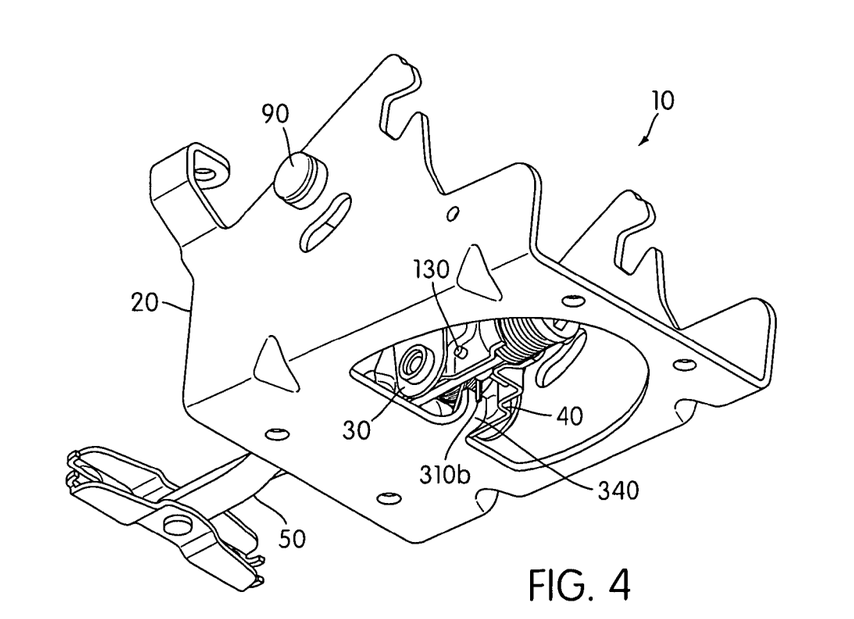
FIG. 4 is a bottom right partial perspective view of the parking brake actuator shown in FIG. 1.

The second free end of the clutch spring 310 is naturally biased toward its engaged position. As shown in FIG. 4, the frame 20 includes a protrusion 340 that is shaped and positioned such that when the self-adjustment frame 40 moves from its second to its first position, the second end 310b abuts the protrusion 340 and moves into its disengaged position. Conversely, when the self-adjustment frame 40 moves from its first position toward its second position, the second end 310b separates from the protrusion 340 and the moves into its engaged position.

According to an alternative embodiment of the present invention, the protrusion 340 is movably connected to the lever 30 such that relative movement between the protrusion 340 and second free end 310b of the clutch spring 310 is amplified relative to motion of the brake lever 30 relative to the frame 20. Such amplified movement may be advantageous in embodiments in which an angular displacement of the free end 310b needed to engage the clutch 70 would otherwise be greater than an angular displacement of the lever 30 desired to engage the clutch 70. For example, the protrusion 340 may be provided on a long end of a moment arm that pivotally connects to the frame 20 (or lever 30). An opposite short end of the moment arm engages a part of the lever 30 (or frame 20) as the lever 30 pivots away from its brake-released position. Movement of the lever 30 is amplified through the moment arm to move the protrusion 340 out of engagement with the free end 310b after only a small angular movement of the lever 30.

While the illustrated clutch 70 utilizes a clutch spring 310 and hub 300 to selectively impede rotational movement of the pinion 60, the clutch 70 may alternatively comprise any other type of suitable clutch that can be engaged or disengaged in response to actuation of the brake lever 30.

Hereinafter, operation of the parking brake actuator 10 is described. When the brake lever 30 and self-adjustment frame 40 are in their first positions, the second end of the clutch spring 310 abuts the protrusion 340, which causes the clutch 70 to disengage. With the clutch 70 disengaged, the hub 300 and pinion 60 are rotatable, thereby permitting the rack 50 to move longitudinally forward under the force of the spring 190 to take up slack (if any) in the brake cables 160.

To actuate the parking brake actuator 10, an operator moves the lever 30 from its first position toward its second position. This movement separates the second free end of the clutch spring 310 from the protrusion 340, which causes the clutch 70 to engage. The engaged clutch 70 discourages the hub 300 and pinion 60 from pivoting in the first direction, which discourages the rack 50 from moving in a loosening direction relative to the self-adjustment frame 40. Once the clutch 70 is engaged, further movement of the lever 30 toward its second position causes the self-adjustment assembly pivot axis 120 to pivot about the pivot axis 95 of the lever 30, thereby moving the rack 50 forward away from the sheathing 170. Forward movement of the rack 50 tensions the cables 160, which engages the wheel brake (not shown). An operator uses the locking mechanism 110 to lock the lever 30 and parking brake actuator 10 in an engaged position.

To release the parking brake, the operator releases the locking mechanism 110 and returns the lever 30 to its first position, thereby disengaging the parking brake, disengaging the clutch 70, and allowing the spring-biased rack 50 to take up slack that may have developed in the cables 160.

In operation, the brake lever 30 remains continuously connected to the brake cables 160 via the continuously meshing teeth 50d, 60a of the pinion 60 and rack 50. The securely engageable and disengageable clutch 70 selectively permits the rack 50 to move relative to the brake lever 30 to take up slack in the cables 160. The continuously meshing teeth 50d, 60a do not slip or allow tooth skip relative to each other, as is possible in conventional self-adjusting brake actuators that utilize teeth that engage and disengage from each other to connect and disconnect a brake lever from a brake cable. The brake actuator 10 therefore provides more reliable operation than such conventional self-adjusting brake actuators.

Figure 7:
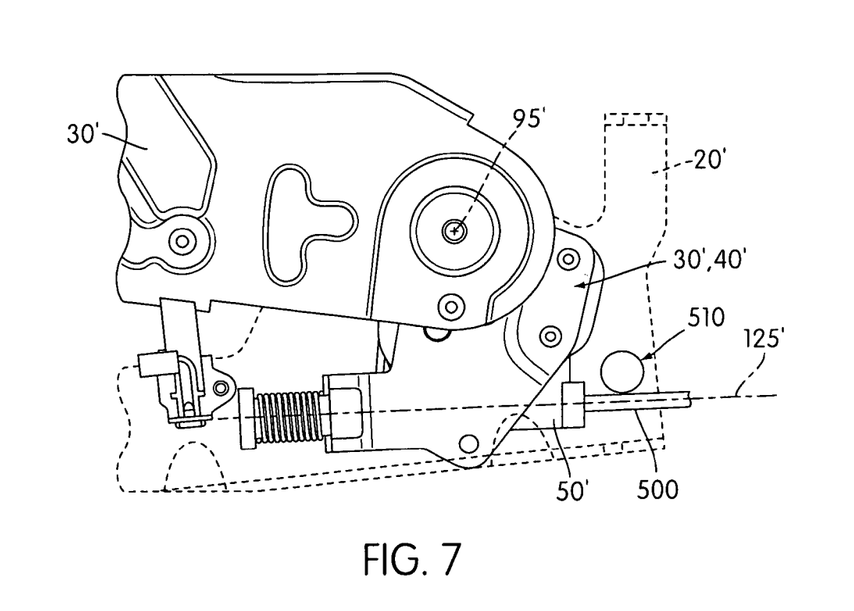
FIG. 7 is a left plan view of a parking brake actuator according to an alternative embodiment of the present invention.
Figure 8:
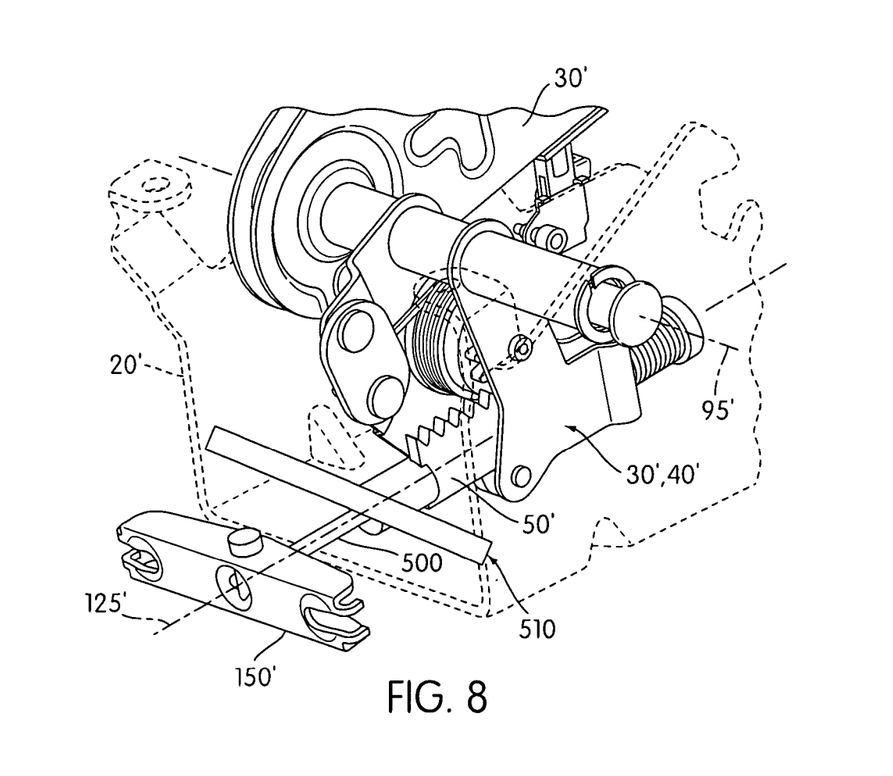
FIG. 8 is a rear, right, partially-cutaway, perspective view of the parking brake actuator in FIG. 7.

FIGS. 7 and 8 illustrate a brake actuator 10' according to an alternative embodiment of the present invention. The brake actuator 10' is generally similar to the brake actuator 10. Accordingly, a redundant description of similar components and features is omitted. The actuator 10' differs from the actuator 10 in that the actuator 10' includes a self-adjustment frame 40' that is integrally formed with (or otherwise rigidly connected to) a brake lever 30'. A flexible cable 500 extends between an equalizer 150' and a rack 50'. A rivet or pulley 510 extends laterally across a frame 20' of the actuator 10'. The pulley 510 generally aligns with a longitudinal axis 125' of the rack 50'. During operation of the actuator 10', the cable 500 bends around the pulley 510. When the lever 30' pivots from its first to its second position to actuate the wheel brake, the rack 50' pivots with the lever 30' about a brake lever axis 95'. The rack 50' and pulley 510 are positioned such that the longitudinal axis 125' of the rack 50' remains generally aligned with the pulley 510 as the rack 50' pivots with the lever 30' between its first and second positions so as to minimize bending forces exerted on the rack 50' by the cable 500.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A parking brake actuator comprising:
    a brake lever movable between brake-released and brake-applied positions; and
    a self-adjustment assembly comprising:
        a rack mounted for movement relative to the lever along a longitudinal direction of the rack, the rack comprising a plurality of rack teeth,
        a cable connector for operatively connecting the rack to a brake cable,
        a resilient member constructed to bias the rack relative to the lever along its longitudinal direction in a tensioning direction,
        a rotatable pinion having pinion teeth that engage the rack teeth such that movement of the rack relative to the lever along its longitudinal direction rotates the pinion, and
        a clutch having an engaged position that prevents the pinion from rotating at least in a first direction corresponding to movement of the rack relative to the lever opposite the tensioning direction, the clutch also having a disengaged position that allows the pinion to rotate in at least a second direction corresponding to movement of the rack relative to the lever in the tensioning direction, wherein the clutch is constructed and positioned to be disposed in the disengaged position when the lever is in its brake-released position, and wherein the clutch is constructed and positioned to be disposed in the engaged position when the lever moves away from its brake-released position and toward its brake-applied position.

2. The actuator of claim 1, wherein the self-adjustment assembly connects to the lever for pivotal movement relative to the lever about a self-adjustment assembly axis.

3. The actuator of claim 2, wherein:
    the self-adjustment assembly further comprises a self-adjustment assembly frame pivotally connected to the lever at the self-adjustment assembly axis;
    the pinion rotatably connects to the self-adjustment assembly frame; and
    the rack is mounted with respect to the self-adjustment assembly frame for movement relative to both the self-adjustment assembly frame and the lever along the longitudinal direction of the rack.

4. The actuator of claim 1, wherein the pinion rotatably connects to the lever.

5. The actuator of claim 1, wherein:
    the actuator further comprises a brake lever frame; and
    the brake lever connects to the brake lever frame for movement relative to the brake lever frame between the brake lever's brake-released and brake-applied positions.

6. The actuator of claim 1, wherein:
    the clutch comprises a hub and a clutch spring wrapped around the hub;
    the hub connects to the pinion for rotation with the pinion relative to the rack;
    the clutch spring has a free end that is movable between an engaged position that that engages the clutch, and a disengaged position that disengages the clutch, the free end being biased toward its engaged position; and
    the free end of the clutch spring is positioned such that movement of the lever from its brake-applied to its brake-released position causes the free end to move into its disengaged position and disengage the clutch.

7. The actuator of claim 6, further comprising a protrusion movably connected to the lever so as to move relative to the lever when the lever moves between its brake-released and brake-applied positions, wherein movement of the lever from its brake-applied to its brake-released position causes the free end of the clutch spring to abut the protrusion and move into its disengaged position, and wherein movement of the lever from its brake-released position toward its brake-applied position separates the free end from the protrusion such that the free end moves into its engaged position.

8. The parking brake actuator of claim 1, wherein movement of the lever from its brake-applied to its brake-released position causes the clutch to disengage.

9. The parking brake actuator of claim 1, wherein movement of the lever from its brake-released to its brake-applied position causes the clutch to engage.

10. A combination comprising:
    a vehicle with a plurality of wheels;
    a wheel brake operatively connected to at least one of the wheels;
    a brake cable operatively connected to the wheel brake; and
    a parking brake actuator supported by the vehicle, the actuator comprising a brake lever movable between brake-released and brake-applied positions; and a self-adjustment assembly comprising:

a rack mounted for movement relative to the lever along a longitudinal direction of the rack, the rack comprising a plurality of rack teeth, the rack being connected to the brake cable, a resilient member constructed to bias the rack relative to the lever along its longitudinal direction in a tensioning direction, a rotatable pinion having pinion teeth that engage the rack teeth such that movement of the rack relative to the lever along its longitudinal direction rotates the pinion, and a clutch having an engaged position that prevents the pinion from rotating at least in a first direction corresponding to movement of the rack relative to the lever opposite the tensioning direction, the clutch also having a disengaged position that allows the pinion to rotate in at least a second direction corresponding to movement of the rack relative to the lever in the tensioning direction, wherein the clutch is constructed and positioned to be disposed in the disengaged position when the lever is in its brake-released position, and wherein the clutch is constructed and positioned to be disposed in the engaged position when the lever moves away from its brake-released position and toward its brake-applied position.

11. The parking brake actuator of claim 1, wherein, when the clutch is in its disengaged position, the rack is movable in the tensioning direction without movement of the lever.

12. The combination of claim 10, wherein, when the clutch is in its disengaged position, the rack is movable in the tensioning direction without movement of the lever.

13. The combination of claim 10, wherein movement of the lever from its brake-applied to its brake-released position causes the clutch to disengage.

14. The combination of claim 10, wherein movement of the lever from its brake-released to its brake-applied position causes the clutch to engage.

* * * * *